H. B. BRAND.
CHERRY SEEDER.
APPLICATION FILED SEPT. 20, 1919.
1,357,377.
Patented Nov. 2, 1920.
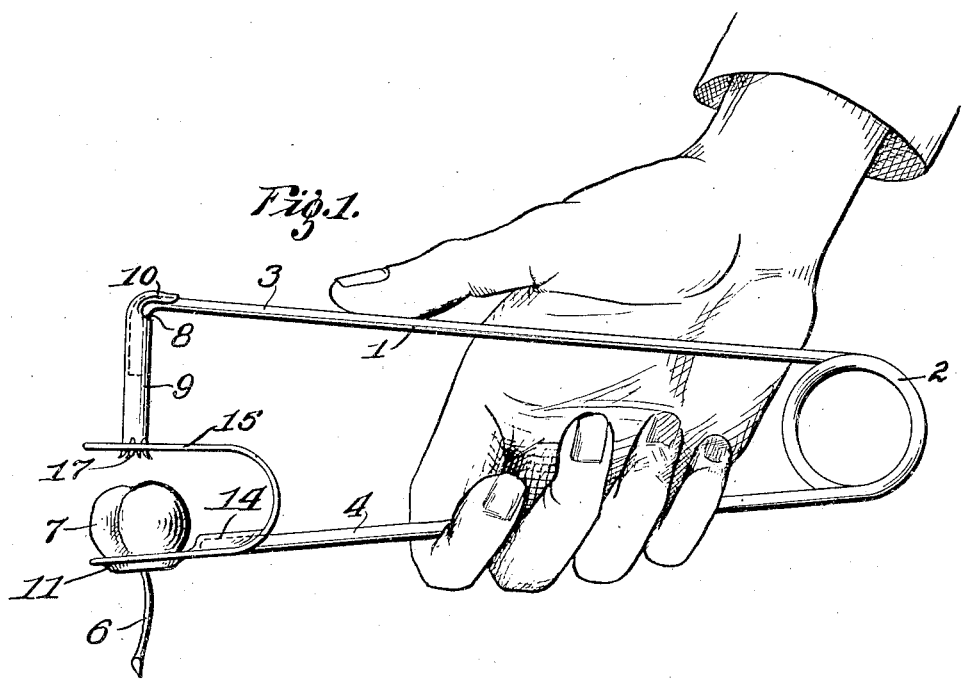
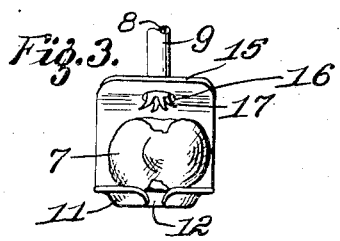
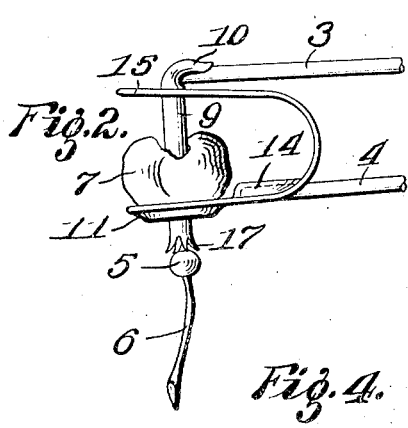
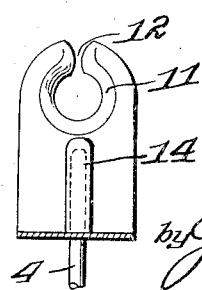
Inventor:
Henry B. Brand
by John C. Higdon
Att'y.

UNITED STATES PATENT OFFICE.

HENRY B. BRAND, OF ST. LOUIS, MISSOURI.

CHERRY-SEEDER.

1,357,377.  Specification of Letters Patent.  Patented Nov. 2, 1920.

Application filed September 20, 1919. Serial No. 325,104.

*To all whom it may concern:*

Be it known that I, HENRY B. BRAND, a citizen of the United States, residing at St. Louis, in the State of Missouri, have invented certain new and useful Improvements in Cherry-Seeders, of which the following is a specification, containing a full, clear, and exact description, reference being had to the accompanying drawings, forming a part hereof.

My invention consists in the novel disclosure that is hereinafter particularly described and distinctly claimed.

The object of my invention is to provide a cheap and simple device for simultaneously removing the pits and stems from cherries and similar fruit, and which shall operate rapidly and in a highly efficient manner.

In the drawings,—

Figure 1 is a perspective view of my improved cherry seeder in operation as a hand implement.

Fig. 2 is a detail view of the parts in the position they assume immediately after a cherry seed and its stem have been expelled from the meat of the cherry.

Fig. 3 is a detail front elevation of the parts in the position they assume after the cherry seed has been expelled, and the meat of the pitted cherry is ready to be removed from the device, and Fig. 4 is a detail sectional plan-view of the slotted socket of the device.

The numeral 1 designates a combined handle, pitting-plunger holder, and slotted-socket holder, which (in the present illustration of my invention) is made of a single piece of spring wire having a coil 2 at the middle of its length, to provide the necessary yielding movement of the upper arm 3 and the lower arm 4 of said combined handle and holder, in removing the seed and stem from a cherry, which are represented, respectively, by the numerals 5 and 6, and 7.

The said arms 3 and 4 extend from the said coil 2 a considerable distance substantially parallel, to form a sufficient hand-hold, to be grasped by the hand of the operator, in the manner shown in Fig. 1, whereby the two arms will be made to approach and recede at their free ends, in punching the seed and stems from the cherries.

The free end of the said upper arm 3 is bent downwardly at a right-angle, to form a vertical holder 8, upon which is removably fixed a tubular seed-punch 9.

The upper end of said tubular seed-punch 9 is slipped over or upon the said vertical punch-holder 8, and is detachably held in position thereon by an integral ear 10 formed on the upper portion of said punch, and bent inwardly at a right-angle until it rests in contact with the upper surface of the said upper arm 3, and is thereat shaped around said arm, or otherwise curved in cross-section, to fit the curvature of said arm, and thereby securely hold said punch in said position until such time as said ear 10 is straightened out.

The straightening of said ear 10, to occupy a position about in alinement with the walls of said punch, will permit the punch to be quickly removed, for repairs, or in replacing it with a new punch.

A combined slotted fruit-socket and punch guide is made of a piece of sheet-metal bent to a U-shape, and attached in the manner now to be described, to the said lower arm 4.

The lower arm of the said U-shaped piece of metal is stamped (or otherwise formed) with a circular fruit-socket 11, in which the cherry to be pitted and stemmed is placed, there being a lateral slot 12 extending from the exterior to the interior of said socket, whereby the stem 6 of the cherry may enter said slot in placing the cherry and its stem in position to be pitted and stemmed, as shown in Fig. 1.

The said U-shaped piece of metal, having the said socket 11 therein or thereon, is attached by soldering or in any other common manner, to the free end of the said lower arm 4 of the device, there being (in the present case) a recess 14 bent upwardly in said socket-arm of said U-shaped body, for receiving the said end of said arm 4, whereby the parts will be assembled as shown, with the open slot 12 of the fruit-socket 11 at the extreme outer end of the said socket-arm. It will be observed that the said socket 11 has a central opening, through which the seed 5 carrying the stem 6, is ejected by the said punch 9 when the upper arm 3 carrying said punch is moved toward said lower arm 4 a sufficient distance.

The upper arm 15 of the said U-shaped body overhangs the said socket 11, and is provided with an opening 16 through which said punch 9 loosely passes.

By such construction the said upper arm 15 acts as a guide and stop for the said punch, as well as a stripper for the punch.

The lower end of said punch 9 is made conical, to receive the seed of the cherry, and center the same, in punching the seed from the cherry, and said conical lower end of said punch is formed with a series of outwardly curved prongs 17, which project laterally a sufficient distance to act as stops against the under surface of the said upper arm 15, and thereby prevent the punch from being withdrawn too far through the said opening 16, so that said punch will always stand (when in its normal position) at the limit of its upward movement, ready to have its pronged lower end driven into and through the body of the cherry, and into and through the said socket 11, in removing the seed from a cherry. (See Fig. 2).

The operation of my invention will be readily understood from the above description.

I claim:—

An improved cherry-seeder, comprising two substantially parallel spring arms connected at like ends; a vertical punch-holder formed by bending downwardly the free end of the upper one of said spring arms; a tubular seed-punch having an integral fastening-ear at its upper end, and outwardly-curved prongs at its lower end and removably slipped on the said vertical punch-holder, and secured in position by bending said ear laterally inwardly at a right-angle until it rests in contact with the adjacent upper surface of said upper spring arm; and a U-shaped fruit-socket punch-stripper and stop secured to the outer end of the lower spring arm and having an opening in its upper arm through which said punch slides, so that said prongs of said punch will be stripped of the punched fruit, and will be stopped in its upward movement, by the said upper arm of said U-shaped device.

In testimony whereof I have signed my name to this specification in presence of two subscribing witnesses.

HENRY B. BRAND.

Witnesses:
WINIFRED McHALE,
JOHN C. HIGDON.